Patented Dec. 21, 1926.

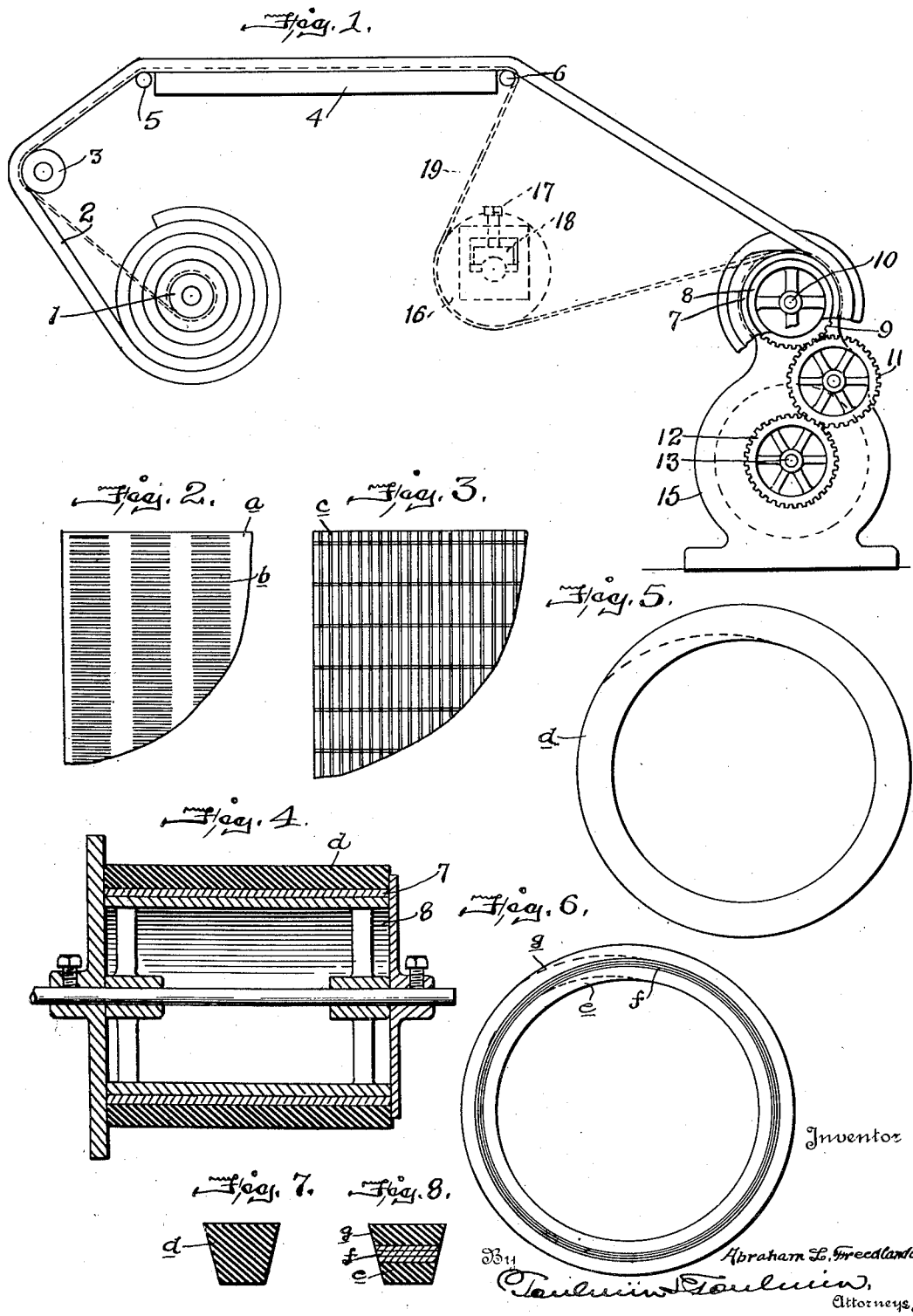

1,611,830

UNITED STATES PATENT OFFICE.

ABRAHAM L. FREEDLANDER, OF DAYTON, OHIO, ASSIGNOR, BY DIRECT AND MESNE ASSIGNMENTS, OF THREE-FOURTHS TO THE DAYTON RUBBER MANUFACTURING COMPANY, OF DAYTON, OHIO, A CORPORATION OF OHIO, AND ONE-FOURTH TO GENERAL MOTORS RESEARCH CORPORATION, OF DAYTON, OHIO, A CORPORATION OF DELAWARE.

DRIVING BELT.

Application filed June 21, 1922. Serial No. 569,941.

This invention embraces an improved driving belt, designed particularly for fan belts for use in automobiles, and a method of manufacturing or producing such a belt.

That branch of my invention which is embodied in the article or belt consists, essentially, of a belt comprised, in the preferred form, of vulcanizable soft rubber mixed with cotton, wool or other fiber, the fibers preferably running crosswise, the whole belt so composed constituting an inner or compression portion a central portion and an outer or tension portion; and in its modified form comprised as to its inner or compression portion and its outer or tension portion of said vulcanizable rubber mixed with such fiber, and as to its central portion of cord fabric preferably cut lengthwise of the warp and transverse to the woof.

That branch of my invention which is embodied in the method of producing this belt consists, essentially, in first fabricating the material by mixing the vulcanizable soft rubber with cotton, wool or other fiber, with the fibers positioned essentially crosswise of the sheet or strip, as to the preferred form of belt; and in likewise fabricating the inner or compression portion and the outer or tension portion of such material with the central portion of cord fabric, in the modified form, such cord fabric undergoing a step of being materially so stretched that when it is embodied in the completed belt its stretchability will have been largely or substantially wholly eliminated; in winding the said material constituting the belt in its preferred form on a forming drum or structure; or in the case of the modified form in first winding the material composing the compression or inner portion on such forming drum or structure; in then winding the material composing the central portion, after or concurrently with the stretching step, on the then wound compression portion; and in winding the material composing the tension portion upon the then wound central portion; and finally in vulcanizing, as by steam heat, the material so fabricated and wound one portion upon the other.

The result of my invention in its two aspects is a driving belt which because of the combined rubber and fibrous material will effectively grip the walls of any grooved pulley on which the belt is used, and which will readily bend and grasp the pulley surfaces; and, in the case of the modified form, will have the further quality of substantial non-stretchability.

In the accompanying drawings forming a part of this specification:

Fig. 1 is a diagrammatic view of a winding apparatus used in carrying out my method;

Fig. 2 is a view of a piece of mixed vulcanizable rubber and fiber;

Fig. 3 is a view of a piece of cord fabric cut lengthwise of the strip;

Fig. 4 is a sectional view of a winding drum, its spool and a roll of belting of the preferred form thereon;

Fig. 5 is a side elevation of a complete belt of the preferred form;

Fig. 6 is a like view of a belt of the modified form;

Fig. 7 is a sectional view of the belt shown in Fig. 5;

Fig. 8 is a like view of the belt shown in Fig. 6.

I will first describe my method because it results in the production of the belt. In this way my invention will be the more readily understood.

Referring first to the apparatus I prefer to employ in carrying out the winding steps of my method, the numeral 1 designates a roll upon which is wound a quantity of the material which is to comprise the belt of the preferred form, namely the vulcanizable soft rubber mixed with cotton, wool or other fiber, with the fibrous pieces or strands positioned essentially crosswise of the strip or sheet. This material is generally designated 2. It passes over the guide roller 3, a flattening platform 4 and supporting rollers 5 and 6 to, and is wound upon, a spool 7 mounted on a drum 8. The drum carries a gear 9 and is mounted on a shaft 10, and the gear is rotated by an idler gear 11 driven by a driving gear 12 on the shaft 13 of an electric or other motor, generally indicated at 15. On this drum is fitted the removable spool 7, as best seen in Fig. 4. The material is wound directly on this spool, which is carried by the drum, the spool being removable with the material then in the form of a roll of belting, as also indicated in Fig. 4.

Knives are utilized in cutting this roll of belting into individual belts, and form the subject of another invention embraced in an application for a patent filed by Amos Puterbaugh June 19, 1922, Ser. No. 569,410.

It will now be seen that when the motor is put in motion the several gears will rotate the drum with its spool, so that the sheet or strip of material so composed of the vulcanizable soft rubber and the fiber will be wound on the spool and be fashioned into the form of the roll of belting above spoken of. After this roll is so formed the drum is removed from the machine and later the spool from the drum, when the belting still wound on the spool is subjected to the vulcanizing step, usually performed by means of steam, in the ordinary manner employed in vulcanizing rubber in the manufacture of rubber tires.

In the case of the production of the modified form of belt shown in Figs. 6 and 8, the material for the inner or compression portion and the outer or tension portion is formed in separate sheets or strips $e$, $f$ and $g$, so that each may be put in the winding machine and wound separately. And in this case also the material which comprises the central portion is separately fabricated, consisting of a sheet or strip of cord fabric cut lengthwise of the warp and therefore crosswise of the woof and rubberized—coated with soft vulcanizable rubber, to form a strong central portion. In order to materially pre-stretch this portion of the belt material I equip the winding machine with the additional features indicated in dotted lines in Fig. 1, in which 16 designates a tension roller operated by a tension screw 17 and a bearing block 18 to secure the right tension on this material of the central portion. In dotted lines indicated at 19, I have also shown such material passing round the tension roller and thence to the spool on the drum. This step is practiced when the modified form of belt is being made, in which case the material for the compression or inner portion of the belt is first wound on the spool; then this material for the central portion is stretched and wound on the now already wound inner portion; and finally the material for the outer or tension portion is wound on the now wound central portion. The inner or compression and the outer or tension portions are of material thick enough to need only one layer when wound, but the material for the central portion is usually wound in three laps, but more or less may be used.

The characteristic of the belt shown in Figs. 5 and 7, the preferred form, is that of yieldability to bend round the pulleys on which it may be used, its capacity to withstand lateral compression or distortion, effects produced on ordinary belts by reason of the tapering form of the pulley grooves; and general strength and durability resulting from the materials used in and the manner of fabricating this belt.

The characteristics of the modified form of belt are those just ascribed to the preferred form with the additional characteristic of greatly reduced stretchability due to the presence in it of the pre-stretched central portion.

It will now be seen that my method consists in fabricating, substantially in the manner above described, the material of which the belt is to be composed, whether the preferred form or the modified form; in winding such material upon a winding instrumentality to form a roll of belting; and, in the case of the modified form, in winding the material of the inner portion first, then pre-stretching and winding the material of the central portion on the inner portion; and then winding the material of the outer portion on the central portion; and in vulcanizing the roll of belting so resulting; the effect of the vulcanization being to cause the materials—the lapped ends in the case of the preferred form of belt, and the lapped ends and overlaid portions of the belt on each other, in the modified form, all to "run" together or unite to make a finished and homogeneous structure.

Referring now to the belt that results from this method, attention is called to Figs. 5, 6, 7 and 8 where the same is illustrated in a complete condition, the belt having been cut or severed from the roll of belting on the spool. The letter $d$ designates the completed belt of the preferred form, Fig. 5. The letter $e$ designates the inner or compression portion of the completed belt of the modified form; the letter $f$ the central portion and the letter $g$ the outer or tension portion.

In Fig. 2 is shown a sheet or strip designated $a$, of vulcanized soft rubber, with the fiber $b$ applied thereto.

In Fig. 3 is shown a sheet or strip, designated $c$, of cord fabric, cut straight with the warp, and therefore crosswise the woof, and designed to be rubberized to form the central portion of the belt in the modified form.

The term "cord fabric" used herein is to be understood as including not only the specific article known in this art as cord fabric, but also fabric used in this art in its more general sense.

Having thus fully set forth my method and described my article, what I desire to claim as new and secure by Letters Patent, is:—

1. The herein described method of making a driving belt consisting in fabricating material therefor of vulcanizable soft rubber mixed with fiber, the strands of which are placed substantially crosswise such material; in winding such material upon a suitable instrument to form a roll of belting; and in vulcanizing such roll.

2. The herein described method of making a driving belt, consisting in fabricating the whole material therefor of vulcanizable soft rubber mixed with fiber, the strands of which are placed substantially crosswise such material; in winding on a suitable instrument such material so fabricated into a cylindrical roll of belting; and in vulcanizing such roll of belting to constitute a complete belt structure.

3. The herein described method of making a driving belt, consisting in fabricating the material for the inner portion of vulcanizable soft rubber mixed with fiber; in fabricating the middle portion of cord fabric cut lengthwise of the warp and rubberized; in fabricating the material for the outer portion of vulcanizable soft rubber mixed with fiber; in winding on a suitable instrument said material of the inner portion; in stretching and winding the material of the middle portion on the then wound inner portion; in winding the material of the outer portion on the then wound central portion; and in vulcanizing the resulting roll of belting to complete the belt structure.

4. The herein described method of making a driving belt, consisting in fabricating the material for the inner portion of vulcanizable soft rubber mixed with fiber, the strands of which are placed substantially crosswise such material; in fabricating the middle portion of cord fabric cut lengthwise of the warp and rubberized; in fabricating the material for the outer portion of vulcanizable soft rubber mixed with fiber, the strands of which are placed substantially crosswise such material; in winding on a suitable instrument said material of the inner portion; in stretching and winding the material of the middle portion on the then wound inner portion; in winding the material of the outer portion on the then wound middle portion; and in vulcanizing the resulting roll of belting to complete the belt structure.

5. A driving belt comprising fabricated material including vulcanizable soft rubber mixed with fiber having the strands thereof transversely placed, such rubber and fiber being in a vulcanized state.

6. A driving belt comprising fabricated material composed wholly of vulcanizable soft rubber mixed with fiber, such rubber and fiber being in a vulcanized state.

7. A driving belt comprising fabricated material composed wholly of vulcanizable soft rubber mixed with fiber having the strands thereof transversely placed, such rubber and fiber being in a vulcanized state.

8. A driving belt comprising an inner portion fabricated of vulcanizable soft rubber mixed with fiber, a central portion fabricated or rubberized cord fabric, and an outer portion fabricated of vulcanizable soft rubber mixed with fiber, all of these portions being in a vulcanized state.

9. A driving belt comprising an inner portion fabricated of vulcanizable soft rubber mixed with fiber whose strands are placed transversely, a central member fabricated of rubberized cord fabric cut lengthwise of the warp, and an outer portion fabricated of vulcanizable soft rubber mixed with fiber whose strands are placed transversely, all of said portions being in a vulcanized state.

In testimony whereof, I affix my signature.

ABRAHAM L. FREEDLANDER.